United States Patent
Roeckl et al.

(10) Patent No.: US 9,086,322 B2
(45) Date of Patent: Jul. 21, 2015

(54) METHOD AND DEVICE FOR DETERMINING A RADIATION CHARACTERISTIC FOR AN ILLUMINATION DEVICE OF A VEHICLE

(71) Applicant: GM GLOBAL TECHNOLOGY OPERATIONS LLC, Detroit, MI (US)

(72) Inventors: Philipp Roeckl, Aschaffenburg (DE); Jan Schuladen, Mainz (DE); Ingolf Schneider, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 84 days.

(21) Appl. No.: 13/776,130

(22) Filed: Feb. 25, 2013

(65) Prior Publication Data

US 2013/0222792 A1  Aug. 29, 2013

(30) Foreign Application Priority Data

Feb. 28, 2012  (DE) .......................... 10 2012 003 999

(51) Int. Cl.
  *G01J 1/00* (2006.01)
  *G01J 1/42* (2006.01)
(52) U.S. Cl.
  CPC ................ *G01J 1/4257* (2013.01); *Y02T 10/82* (2013.01)
(58) Field of Classification Search
  CPC ........................................................ G01J 1/4257
  USPC ......................................................... 356/121
  See application file for complete search history.

(56) References Cited

U.S. PATENT DOCUMENTS

| | | | | |
|---|---|---|---|---|
| 4,634,275 A | * | 1/1987 | Yoshida et al. | 356/121 |
| 4,907,877 A | * | 3/1990 | Fukuda et al. | 356/121 |
| 5,170,220 A | * | 12/1992 | Matsumoto et al. | 356/121 |
| 5,331,393 A | * | 7/1994 | Hopkins et al. | 356/121 |
| 5,373,357 A | * | 12/1994 | Hopkins et al. | 356/121 |

(Continued)

FOREIGN PATENT DOCUMENTS

| | | |
|---|---|---|
| AT | 507199 A4 | 3/2010 |
| DE | 10130994 A1 | 1/2003 |

(Continued)

OTHER PUBLICATIONS

Lecocq, R et.al. "Interactive Headlight Simulation," Proceedings of the Driving Simulation Conference, Jul. 1999, pp. 173-180.

(Continued)

*Primary Examiner* — Roy M Punnoose
(74) *Attorney, Agent, or Firm* — Ingrassia Fisher & Lorenz PC

(57) ABSTRACT

A method for determining a radiation characteristic for a vehicle illumination device to be produced from possible radiation characteristics based on a parameter is provided. The parameter is selected from an illumination geometry that can be generated by the device in a surroundings of the device, a device position, and a person-related type of perception. The method includes determining a first value of a light intensity that can be generated for a first point located within an illuminatable area based on the parameter. A second value of the light intensity that can be generated by the illumination device is determined for second points based on the first value. The second points are arranged in the surroundings of the illumination device. A light distribution that can be generated by the illumination device is determined based on the first and second values and the light distribution is outputted to an interface.

15 Claims, 5 Drawing Sheets

(56) References Cited

U.S. PATENT DOCUMENTS

| | | | |
|---|---|---|---|
| 5,796,473 A * | 8/1998 | Murata et al. | 356/121 |
| 6,038,387 A | 3/2000 | Machida | |
| 6,527,425 B1 * | 3/2003 | Nakata | 362/516 |
| 6,543,922 B2 * | 4/2003 | Komatsu et al. | 362/518 |
| 6,758,589 B2 * | 7/2004 | Hayakawa et al. | 362/539 |
| 7,876,427 B1 * | 1/2011 | Melvin | 356/121 |
| 8,004,663 B1 * | 8/2011 | Melvin | 356/121 |
| 8,184,275 B1 * | 5/2012 | Melvin | 356/121 |
| 8,654,322 B2 * | 2/2014 | Peterson | 356/121 |
| 2007/0080289 A1 | 4/2007 | Theiss et al. | |
| 2010/0103694 A1 * | 4/2010 | Saxena et al. | 362/554 |
| 2013/0265570 A1 * | 10/2013 | Enami | 356/121 |

FOREIGN PATENT DOCUMENTS

| | | |
|---|---|---|
| EP | 2128589 A1 | 12/2009 |
| FR | 2719666 A1 | 11/1995 |
| GB | 1562259 A | 3/1980 |
| GB | 2292604 A | 2/1996 |

OTHER PUBLICATIONS

Tsai. H. et. al. "Computer Assisted Headlight Design and Research," Human Factors in Vehicle Design, Society of Automotive Engineers, 1995, p. 55-62.

* cited by examiner

METHOD AND DEVICE FOR DETERMINING A RADIATION CHARACTERISTIC FOR AN ILLUMINATION DEVICE OF A VEHICLE

CROSS-REFERENCE TO RELATED APPLICATION

This application claims priority to German Patent Application No. 10 2012 003 999.9, filed Feb. 28, 2012, which is incorporated herein by reference in its entirety.

TECHNICAL FIELD

The technical field relates to a method and to a device for determining a radiation characteristic for an illumination device of a vehicle to be produced, a computer program product, and a computer-readable medium.

BACKGROUND

With respect to a light distribution of an illumination device of a vehicle, in particular of a headlamp, there is a possibility for typically evaluating only at the end of a time-consuming development process in numerous post-evaluations. This relates to a subjective evaluation by an observer that can vary. In addition, there is a great dependency of environmental influences, for example weather conditions, ambient brightness, growths on the shoulder of the road and state of the test vehicle. Furthermore, there are hardly any comparison possibilities between a plurality of light systems. Furthermore, a correction of the radiation characteristic of a light system typically leads to cost-intensive tool changes.

At least one object herein is to provide a method and a device for determining a radiation characteristic for an illumination device of a vehicle to be produced. It is also desirable to provide a computer program product and a computer-legible medium, which make possible improved provision and evaluation of a light distribution of the illumination device. In addition, other objects, desirable features and characteristics will become apparent from the subsequent summary and detailed description, and the appended claims, taken in conjunction with the accompanying drawings and this background.

SUMMARY

A method for determining a radiation characteristic for an illumination device of a vehicle to be produced from a plurality of possible radiation characteristics based on at least one parameter is provided. In an exemplary embodiment, the at least one parameter is chosen from the group of an illumination geometry that can be generated by an illumination device in an environment of the illumination device, a position of the illumination device on the vehicle and a person-based type of perception of a generated illumination geometry. The method in an embodiment includes the following steps. Determining of a second value of a light intensity that can be generated by an illumination device for each point of a plurality of second points that differ from the at least one first point, based on the determined first value of the light intensity, takes place. The plurality of second points is arranged in an environment of the illumination device that includes the illuminable region. Furthermore, a determining of a light distribution that can be generated by the illumination device based on the determined first value of the light intensity and the determined second value of the light intensity takes place. In addition to this, an outputting of the determined light distribution to at least one interface takes place.

The method according to the mentioned embodiment makes possible an improved provision and evaluation of the light distribution of the illumination device to be produced. This takes place by determining the first value of the light intensity that can be generated by the illumination device based on the at least one parameter, the determining of the second value of the light intensity that can be generated by the illumination device based on the determined first value of the light intensity and the determining of the light distribution that can be generated by the illumination device based on the mentioned quantities. Thus, the light distribution of the illumination device can be determined to as accurate as possible a degree even before its production, as a result of which elaborate corrections of the radiation characteristic of an existent illumination device can be omitted. In particular, the determined light distribution can be employed as a target for a manufacturer of the illumination device, for example a headlamp manufacturer. In addition, a comparison of different illumination devices or different light systems is advantageously possible with respect to their light distribution and a comparison with a prior development status.

In an embodiment, determining the first value and/or the second value of the light intensity that can be generated by the illumination device additionally takes place based on a light current that can be generated by the illumination device. Because of this, the light current of the illumination device or of the lighting unit can be taken into account in determining the light distribution.

The determining of the light distribution that can be generated by the illumination device can include a determining of a horizontal light distribution that can be generated by the illumination device at a predetermined height and/or a determining of a vertical light distribution that can be generated by the illumination device at a predetermined distance from the illumination device. The mentioned types of the light distribution are suitable to a particular degree for an evaluation or a comparison. In particular, a horizontal light distribution that can be generated by the light distribution at the height of a road can be determined.

In an embodiment of the method, determining the first value of the light intensity that can be generated by the illumination device takes place based on a person-related type of perception taking into account a sitting position of an occupant of the vehicle. Thus, the sitting position of the occupant, for example a driver of the vehicle, can be included in determining and evaluating the radiation characteristic of the illumination device even before its production.

In a further embodiment of the method, the determining of the first value of the light intensity that can be generated by the illumination device takes place based on a person-related perception type taking into account physiological parameters of at least one person. This makes possible a definition of the light distribution taking into account physiological aspects. Thus, the light distribution can be determined for example with respect to whether it is pleasant to the driver and, for example, not very tiring, and with regard to whether it is safe for the driver and/or other road users.

The determining of the first value of the light intensity that can be generated by the illumination device, in an embodiment, furthermore take place based on an illumination geometry that can be generated by the illumination device taking into account a predetermined degree of symmetry of the illumination geometry. In particular, determining the first value taking into account a homogeneous illumination in a predetermined region in front of the vehicle, a large-area illumination of a predetermined side of the road by an asymmetrical wedge, an opening angle of the light distribution and/or with respect to adequate scattered light for detecting traffic signs can take place.

The determining of the first value of the light intensity that can be generated by the illumination device preferably takes place for each point of a plurality of first points taking into account a predetermined course of the light intensity between the first points. The light intensity is thus defined for a multiplicity of first points. The determining of the second value, which takes place based on the determined first values, can then take place to as accurate as possible a degree.

The first points, for example, are arranged on a straight line, wherein the straight line runs in a predeterminable direction relative to the vehicle. In particular, the predeterminable direction relative to the vehicle can correspond to a viewing direction of an occupant of the vehicle.

Determining the second value of the light intensity that can be generated by the illumination device in an embodiment is effected by an interpolation of the determined first values of the light intensity, for example by means of a linear or cubic interpolation. The type of the interpolation in this case can be determined by a user input.

In a further embodiment of the method, a comparing of the determined light distribution with a predetermined light distribution takes place. Because of this, the determined light distribution can be verified for example with respect to legal requirements.

Furthermore, adapting the determined light distribution based on the predetermined light distribution can be take place. For example, the light distribution can be adjusted if it fails to comply with legal requirements at least in part areas.

In a further embodiment, the illumination device is produced taking into account the determined light distribution. Here, the geometry of the illumination device, in particular the geometry of a light source and/or of a reflector of the illumination device is adjusted as a function of the determined light distribution in such a manner that the illumination device is able to generate the determined light distribution.

A device for determining a radiation characteristic for an illumination device of a vehicle to be produced from a plurality of possible radiation characteristics based on at least one parameter is also provided herein. In an exemplary embodiment, the at least one parameter is selected from the group of an illumination geometry that can be generated by the illumination device in a surroundings of the illumination device, a position of the illumination device on the vehicle and a person-based type of perception of a generated illumination geometry. Furthermore, the device comprises a first determining unit, which is designed for determining a first value of a light intensity that can be generated by the illumination device for at least one first point located within a region that can be illuminated by the illuminating device, based on the at least one parameter. In addition, the device comprises a second determining device, which is designed for determining a second value of a light intensity that can be generated by the illuminating device for each point of a plurality of second points, based on the determined first value of the light intensity, wherein the plurality of second points is arranged in a surroundings of the illumination device that includes the illuminable region. In addition to this, the device comprises a third determining device, which is designed for determining a light distribution that can be generated on by the illumination device based on the determined first value of the light intensity and the determined second value of the light intensity.

Furthermore, the device comprises an output unit, which is designed for outputting the determined light distribution on at least one interface.

The device contemplated herein has the advantages already mentioned in connection with the method described above, which will not be mentioned at this point in order to avoid repetitions.

In addition to this, another embodiment provides a device for determining a radiation characteristic for an illumination device of a vehicle to be produced from a plurality of possible radiation characteristics based on at least one parameter, wherein the at least one parameter is selected from the group of an illumination geometry that can be generated by the illumination device in a surroundings of the illumination device, a position of the illumination device on the vehicle and a person-related type of perception of a generated illumination geometry. The device comprises means for determining a first value of a light intensity that can be generated by the illumination device for at least one first point located within an area that can be illuminated by the illumination device based on the at least one parameter. In addition, the device comprises means for determining a second value of a light intensity that can be generated by the illumination device for each point of a plurality of second points, based on the determined first value of the light intensity, wherein the plurality of second points is arranged in a surroundings of the illumination device including the illuminable area. In addition to this, the device comprises means for determining a light distribution that can be generated by the illumination device based on the determined first value of the light intensity and the determined second value of the light intensity. Furthermore, the device comprises means for outputting the determined light distribution to at least one interface.

In another embodiment, a computer program product is provided. The computer program product, when it is executed on a computing unit of a device for determining a radiation characteristic for an illumination device of a vehicle to be produced from a plurality of possible radiation characteristic based on at least one parameter, wherein the at least one parameter is selected from the group of an illumination geometry that can be generated by the illumination device in a surroundings of the illumination device, a position of the illumination device on the vehicle and a person-related type of perception of a generated illumination geometry, instructs the computing unit to carry out the following steps. The computing unit is instructed for determining a first value of a light intensity that can be generated by the illumination device for at least one first point located within an area that can be illuminated by the illumination device, based on the at least one parameter. In addition to this, the computing unit is instructed for determining a second value of a light intensity that can be generated by the illumination device for each point of a plurality of second points, based on the determined first value of the light intensity, wherein the plurality of second points is arranged in a surroundings of the illumination device including the illuminable area. Furthermore, the computing unit is instructed for determining a light distribution that can be generated by the illumination device based on the determined first value of the light intensity and the determined second value of the light intensity. In addition to this, the computing unit is instructed for outputting the determined light distribution to at least one interface.

Furthermore, an exemplary embodiment provides a computer-readable medium on which a computer program product according to the mentioned embodiment is stored.

The computer program product and the computer-readable medium as contemplated herein have the advantages already mentioned in connection with the method described above, which at this point are not mentioned again in order to avoid repetitions.

In the abovementioned embodiments, the vehicle is preferably a motor vehicle, in particular a passenger motor vehicle or a commercial motor vehicle.

The illumination device to be produced is preferably a headlamp of the vehicle, in particular a xenon headlamp, i.e. a headlamp comprising a xenon gas discharge lamp.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
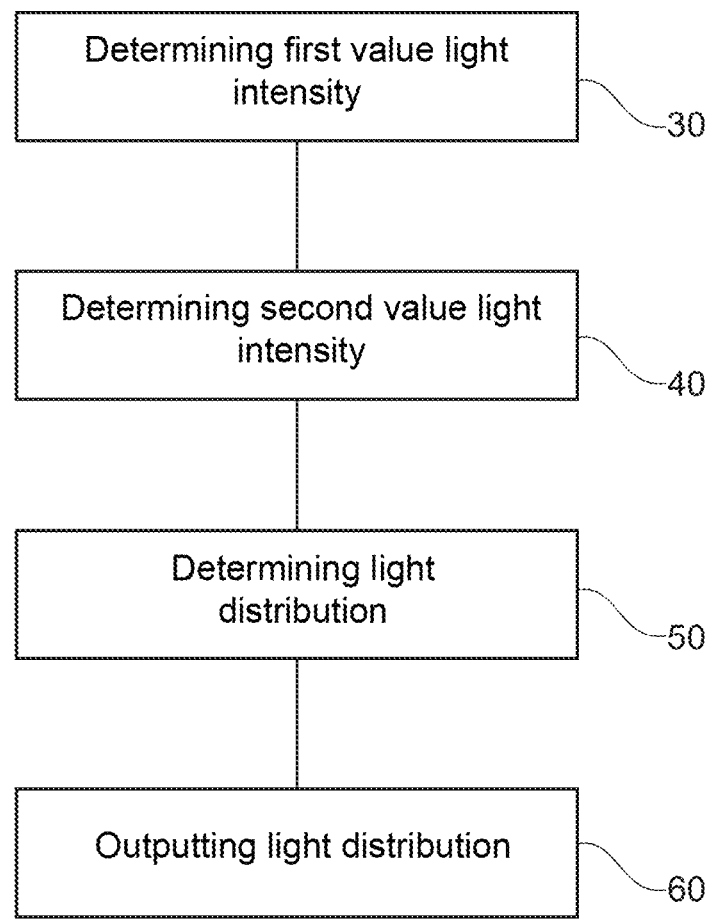
FIG. 1 is a flow diagram of a method for determining a radiation characteristic for an illumination device of a vehicle to be produced according to an exemplary embodiment.

FIG. 1 shows a flow diagram of a method for determining a radiation characteristic for an illumination device of a vehicle to be produced according to an exemplary embodiment. The vehicle is for example a motor vehicle, in particular a passenger motor vehicle, and the illumination device to be produced is typically a headlamp, in particular a xenon headlamp.

The radiation characteristic is determined from a plurality of possible radiation characteristics based on at least one parameter, wherein the at least one parameter is selected from the group consisting of an illumination geometry that can be generated by the illumination device in a surroundings of the illumination device, a foreseen position of the illumination device on the vehicle to be produced, and a person-related type of perception of a generated illumination geometry.

In a step 30, in an embodiment, there follows a determining of a first value of a light intensity that can be generated by the illumination device for at least one first point located within an area that can be illuminated by the illumination device, based on the at least one parameter.

The determining of the first value in this case can take place taking into account a sitting position of an occupant of the vehicle, in particular of a driver of the vehicle, and/or taking into account physiological parameters of at least one person. Furthermore, the determining of the first value can take place taking into account a predeterminable degree of symmetry of the illumination geometry. In addition, the determining of the first value of the light intensity that can be generated by the illumination device preferably takes place based on a light current that can be generated by the illumination device.

Furthermore, the first value of the light intensity that can be generated by the light illumination device for a plurality of first points taking into account a predeterminable course of the light intensity between the first points can be determined. The first points in this case are arranged for example on a straight line, wherein the straight line runs in a predeterminable direction to the vehicle.

In a step 40, in an embodiment, a determining of a second value of a light intensity that can be generated by the illumination device for each point of a plurality of second points, based on the determined first value of the light intensity takes place. The second points in this case are arranged in a surroundings of the illumination device including the illuminable area.

The determining of the second value preferably takes place by an interpolation of the determined first values, for example by means of a linear or cubic interpolation. Furthermore, the determining of the second value can take place based on the light current that can be generated by the illumination device.

In an exemplary embodiment, in a step 50, a light distribution that can be generated by the illumination device is determined based on the determined first value of the light intensity and the determined second values of the light intensity.

To this end, a horizontal light distribution that can be generated by the illumination device at a predetermined height and/or a vertical light distribution that can be generated by the illumination device at a predetermined distance can be determined based on the determined first value and the determined second values of the light intensity. The horizontal light distribution in this case includes both values of the points that are located in the corresponding horizontal plane and the vertical light distribution those values of the points which are arranged in the corresponding vertical plane.

In a step 60, in an embodiment, the determined light distribution is output to at least one interface. The outputting of the determined light distributions in this case can include an outputting of the determined light distributions to a display device. Furthermore, the determined light distribution can be output in a specific data format, for example, for an exchange with a manufacturer of the illumination device.

Figure 2:
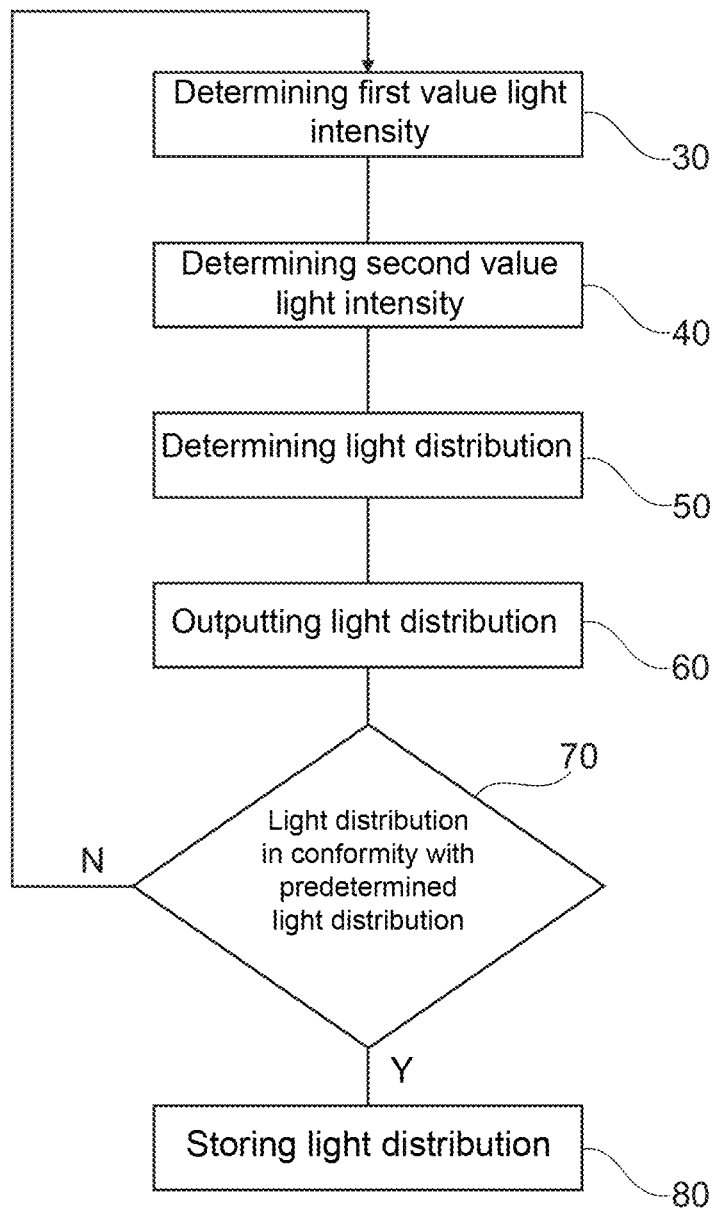
FIG. 2 is a flow diagram of a method for determining a radiation characteristic for an illumination device of a vehicle to be produced according to another exemplary embodiment.

FIG. 2 shows a flow diagram of a method for determining a radiation characteristic for an illumination device of a vehicle to be produced according to another embodiment. The vehicle is for example a motor vehicle, in particular a passenger motor vehicle, and the illumination device to be produced is typically a headlamp, in particular a xenon headlamp.

In an exemplary embodiment, in a step 30, there follows a determining of a first value of a light intensity that can be generated by the illumination device for at least one first point located within an area that can be illuminated by the illumination device, based on at least one parameter, corresponding to step 30 of the embodiment shown in FIG. 1.

Furthermore, there follows in a step 40 a determining of a second value of a light intensity that can be generated by the illumination device for each point of a plurality of second points, corresponding to step 40 of the embodiment shown in FIG. 1.

In a step 50, there follows a determining of a light distribution that can be generated by the illumination device based on the determined first value of the light intensity and the determined second values of the light intensity and in a step 60, the determined light distribution is output to at least one interface. The steps 50 and 60 in this case correspond to the steps 50 and 60 of the embodiment shown in FIG. 1.

In a step 70, the determined light distribution is compared with a predetermined light distribution. To this end, it is determined in the shown embodiment if the determined light distribution conforms to a legally predetermined light distribution.

If in the process it is determined that the light distribution does not conform to the predetermined light distribution, the steps 30 to 60 are carried out repeatedly, i.e. there follows an adjusting of the determined light distribution based on the predetermined light distribution.

If the determined light distribution however conforms to the predetermined light distribution, a storing of the determined light distribution takes place in a step 80. Furthermore, the illumination device can subsequently be produced taking into account the determined light distribution.

By means of the shown embodiment, an efficient and flexible definition of light distributions for the exterior illumination in particular of motor vehicles and an objective evaluation of light distributions by comparison with the generated specification can take place.

Here, brand-specific or vehicle-specific light distributions can be produced in particular with the help of the mentioned embodiments. Through a quick and simple generation or manipulation of the light distribution, the latter can be comfortably adapted to new requirements and conditions. This produces a definition of desired light values that are included before the development process and serve as objective for internal and external development areas.

In particular, exact specifications regarding the desired light distribution can be made available to the producers of illumination-relevant parts, which can be verified upon delivery. Through the exact specification of light distributions it is simpler for the manufacturer to produce desired parts. Thus, the number of test cycles can be reduced, which results in savings with regard to time expenditure and costs up to the series maturity of a component. In particular, reworking loops in terms of post-evaluations can be largely omitted since the result of the light system can already be evaluated beforehand. Because of this, improvements or corrections can take place during the running development process and evaluation criteria that are always the same and objective can be provided. Furthermore, a direct comparison of different light systems or a direct comparison with a previous development status is made possible. Furthermore, costs for headlamp prototypes are minimized based on the generation and evaluation of the light distribution, which can be carried out digitally corresponding to the mentioned embodiments and the best possible light performance can be provided to the user.

Here, a definition of the distributions is effected in an embodiment by means of points, wherein a typically idealized distribution is created according to perception-physiological aspects and displayed directly. The display of the generated distribution can take place in particular in the following views as is explained in more detail in connection with the following Figures: bird's eye view or top view, ISO-candela, ECE measuring screen at a distance of 25 meters. The light distribution in this case is presented for example by a false color representation. To evaluate the ECE-conformity, a test according to R98 xenon headlamps with z-distribution can be additionally implemented through direct testing of the required points in the view of the ECE. Furthermore, the data can be exported in a standard format for display and evaluation in a light simulation software.

Figure 3:
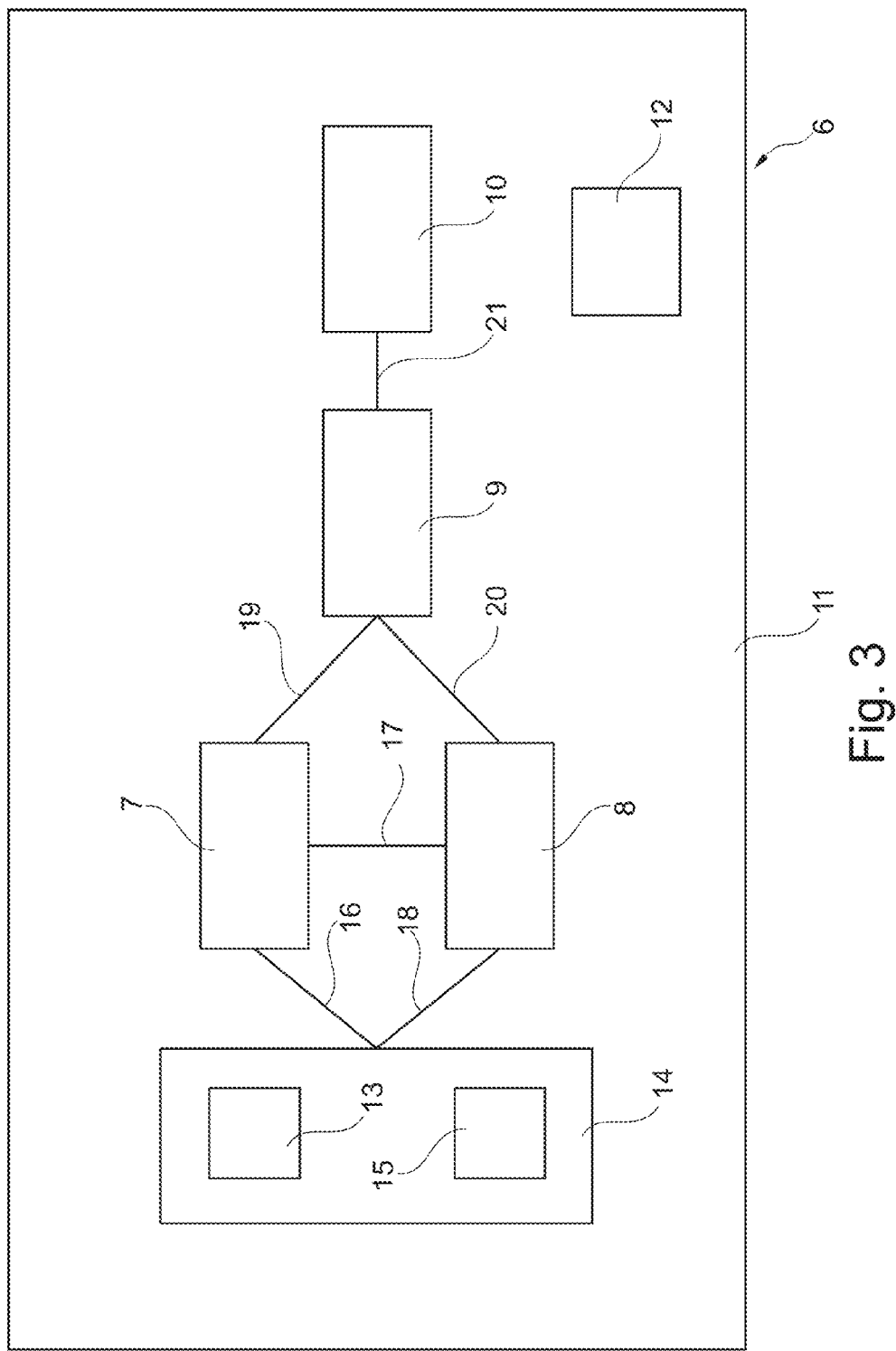
FIG. 3 is a block diagram of a device for determining a radiation characteristic for an illumination device of a vehicle to be produced according to an exemplary embodiment.

FIG. 3 shows a device 6 for determining a radiation characteristic for an illumination device of a vehicle to be produced which is not shown in more detail according to an embodiment.

The vehicle is for example a motor vehicle, in particular a passenger car, and the illumination device is for example a xenon headlamp of the vehicle to be produced.

The radiation characteristic is determined from a plurality of possible radiation characteristics based on at least one parameter, wherein the at least one parameter is selected from the group of an illumination geometry that can be generated by the illumination device in a surroundings of the illumination device, a position of the illumination device on the vehicle and a person-related type of perception of a generated illumination geometry.

The device 6 comprises a first determining unit 7, which is designed for determining a first value of a light intensity that can be generated by the illumination device for at least one first point located within an area that can be illuminated by the illumination device based on the at least one parameter.

To this end, the first determination unit 7 in the shown embodiment is connected to an input unit 14 via a signal line 16, by means of which the at least one parameter can be determined in an input area 13 of the input unit 14 via a user input.

Furthermore, the device 6 comprises a second determination unit 8, which is designed for determining a second value of a light intensity that can be generated by the illumination device for each point of a plurality of second points based on the determined first value of the light intensity. The second points in this case are arranged in a surroundings of the illumination device including that of the illuminable area.

The second determination unit 8 in this case is connected to the first determination unit 7 via a signal line 17. The second determination unit 8 in the shown embodiment is designed for determining the second value of the light intensity that can be generated by an interpolation of the determined first value of the light intensity. Here, the second determination unit 8 is connected to the input unit 14 via a signal line 18, by means of which a type of interpolation by a user input in an input area 15 of the input unit 14 can take place.

Furthermore, the device 6 comprises a third determination unit 9, which is configured for determining a light distribution that can be generated by the illumination device based on the determined first value of the light intensity and the determined second values of the light intensity. The third determination unit 9 in this case is connected to the first determination unit 7 via a signal line 19 and to the second determination unit 8 via a signal line 20.

In addition to this, the device 6 comprises an output unit 10, which is designed for outputting the determined light distribution to at least one interface which is not shown in more detail. For example, the output unit 10 is configured for outputting the determined light distribution to a visual output device. The output unit 10 to this end is connected to the third determination unit 9 via a signal line 21. The mentioned components of the device 6, in the shown embodiment, are part of a computing unit 11, wherein the computing unit 11 additionally comprises a computer-readable medium 12, wherein on the computer-readable medium 12 a computer program product is stored which, when it is executed on the computing unit 11, instructs the computing unit 11 to carry out the steps mentioned in connection with the embodiments of the method, in particular the steps of the embodiments shown in the FIGS. 1 and 2, by means of the elements mentioned therein.

Figure 4:
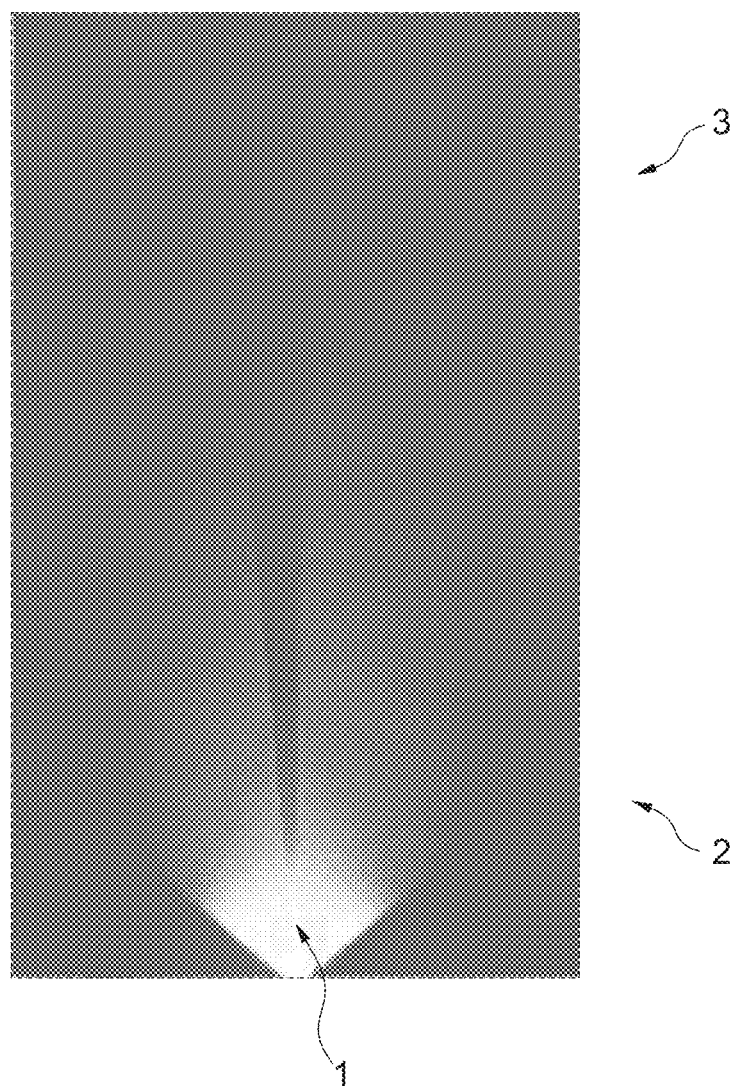
FIG. 4 is a determined light distribution to be generated by an illumination device.

FIG. 4 shows a determined light distribution 3 to be generated by an illumination device of a vehicle to be produced.

The light distribution 3 in this case is determined by a method according to one of the embodiments contemplated herein. The light distribution 3 shown in FIG. 4 constitutes a horizontal light distribution to be generated by the illumination device, typically a light distribution to be generated at the height of a road to be traveled by the vehicle.

As is shown in FIG. 4, the light distribution 3 comprises an area 1 that can be illuminated by the illumination device, which is located in a surroundings 2 of the illumination device to be produced. The surroundings 2 thus includes the illuminable area 1.

Figure 5A:
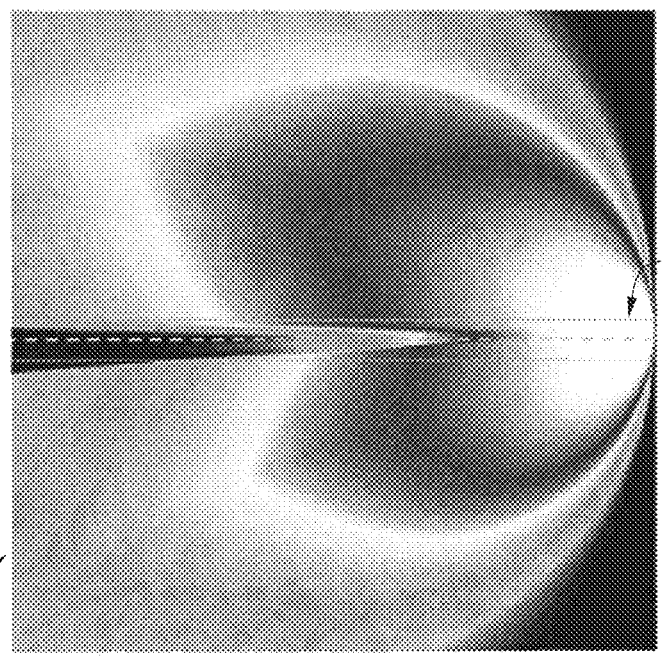
FIGS. 5A to 5C are further determined light distributions to be generated by an illumination device.
Figure 5B:
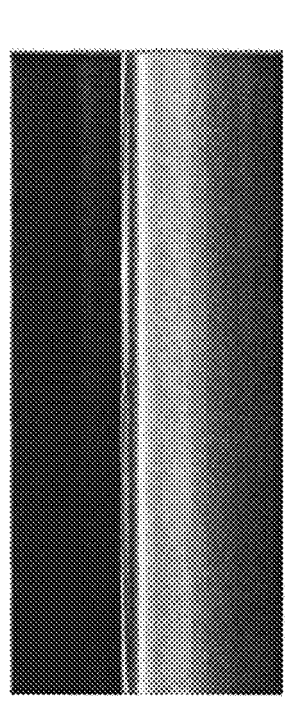
Figure 5C:
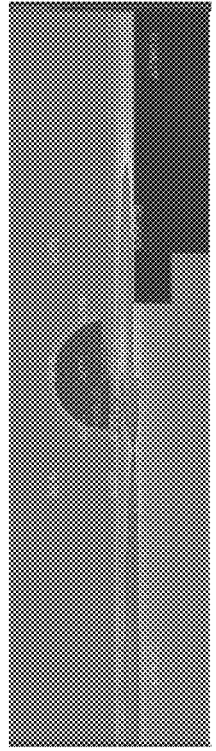

FIGS. 5A to 5C show further determined light distributions 3, 4 and 5 to be generated by an illumination device of a vehicle to be produced.

Here, FIG. 5A again shows a bird's eye view, wherein the determined light distribution 3 is shown at the height of a road 22 to be traveled by the vehicle.

FIG. 5B shows a so-called ISO-candela view of the determined light distribution 4. Here, the area of the light distribution to be shown is represented in a coordinate system of horizontal and vertical angles, wherein the origin of the coordinate system is formed by the center of the bumper at the attachment height of the illumination device.

FIG. 5C shows a representation of the light distribution 5 on a so-called ECE-screen. Here, a Cartesian coordinate system is used, with which the connecting straight lines between coordinate origin and center of the illumination device to be evaluated stands perpendicularly on the x-y plane of the ECE-screen.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for
determining a radiation characteristic for an illumination device of a vehicle to be produced from a plurality of possible radiation characteristics based on at least one parameter, wherein the at least one parameter is selected from a group consisting of an illumination geometry that the illumination device is configured to generate in a surroundings of the illumination device, a position of the illumination device on the vehicle, and a person-related type of perception of a generated illumination geometry, wherein the method comprises the steps of:
determining a first value of a light intensity generated for at least one first point located within an illuminable area that the illumination device is configured to illuminate, based on the at least one parameter;
determining a second value of the light intensity generated by the illumination device for each point of a plurality of second points, based on the first value of the light intensity, wherein the plurality of second points is arranged in the surroundings of the illumination device including the illuminable area;
determining a light distribution that the illumination device is configured to generate based on the first value of the light intensity and the second value of the light intensity; and
outputting the light distribution to an interface.

2. The method according to claim 1, wherein the determining of the first value and/or of the second value of the light intensity generated by the illumination device additionally takes place based on a light current generated by the illumination device.

3. The method according to claim 1, wherein the determining of the light distribution generated by the illumination device includes a determining of a horizontal light distribution generated by the illumination device at a predetermined height and/or a determining of a vertical light distribution generated by the illumination device at a predetermined distance.

4. The method according to claim 1, wherein the determining of the first value of the light intensity generated by the illumination device is based on the person-related type of perception taking into account a sitting position of an occupant of the vehicle.

5. The method according to claim 1, wherein the determining of the first value of the light intensity generated by the illumination device is based on physiological parameters of a person.

6. The method according to claim 1, wherein the determining of the first value of the light intensity generated by the illumination device is based on the illumination geometry generated by the illumination device taking into account a predeterminable degree of symmetry of the illumination geometry.

7. The method according to claim 1, wherein the determining of the first value of the light intensity generated by the illumination device, for each of a first point of a plurality of first points, takes into account a predeterminable course of the light intensity between each of the first point of the plurality of first points.

8. The method according to claim 7, wherein the plurality of first points are arranged on a straight line, wherein the straight line runs in a predeterminable direction to the vehicle.

9. The method according to claim 7, wherein the determining of the second value of the light intensity generated by the illumination device is performed by an interpolation of the first value of the light intensity.

10. The method according to claim 1, further comprising comparing the light distribution with a predetermined light distribution.

11. The method according to claim 10, further comprising adjusting the light distribution based on the predetermined light distribution.

12. The method according to claim 1, further comprising producing the illumination device taking into account the light distribution.

13. A device for determining a radiation characteristic for an illumination device of a vehicle to be produced from a plurality of possible radiation characteristics based on at least one parameter, wherein the at least one parameter is selected from a group consisting of an illumination geometry that the illumination device is configured to illuminate in a surroundings of the illumination device, a position of the illumination device on the vehicle and a person-related type of perception of a generated illumination geometry, wherein the device comprises:
a first determination unit configured for determining a first value of a light intensity generated by the illumination device for at least one first point located within an illuminable area that the illumination device is configured to illuminate, based on the at least one parameter;
a second determination unit configured for determining a second value of the light intensity generated by the illumination device for each point of a plurality of second points, based on the first value of the light intensity, wherein the plurality of second points is arranged in the surroundings of the illumination device that includes the illuminable area;
a third determination unit configured for determining a light distribution that the illumination device is configured to generate based on the first value of the light intensity and the second value of the light intensity; and
an output unit configured for outputting the light distribution to an interface.

14. A computer program product comprising a non-transitory computer usable medium having a computer readable program code embodied therein, the computer readable program code adapted to be executed to implement a method for determining a radiation characteristic for an illumination device of a vehicle to be produced from a plurality of possible radiation characteristics based on at least one parameter, wherein the at least one parameter is selected from a group consisting of an illumination geometry that the illumination device is configured to generate in a surroundings of the illumination device, a position of the illumination device on the vehicle, and a person-related type of perception of a generated illumination geometry, the method comprising the steps of:
determining a first value of a light intensity generated by the illumination device for at least one first point located within an illuminable area that the illumination device is configured to illuminate, based on the at least one parameter;
determining a second value of the light intensity generated by the illumination device for each point of a plurality of second points, based on the first value of the light intensity, wherein the plurality of second points is arranged in the surroundings of the illumination device including the illuminable area;
determining a light distribution that the illumination device is configured to generate based on the first value of the light intensity and the second value of the light intensity; and
outputting the light distribution to an interface.

15. A non-transitory computer-readable medium embodying a computer program product, the computer program product comprising:
a computer program configured to implement a method for determining a radiation characteristic for an illumination device of a vehicle to be produced from a plurality of possible radiation characteristics based on at least one parameter, wherein the at least one parameter is selected from a group consisting of an illumination geometry that the illumination device is configured to generate in a surroundings of the illumination device, a position of the illumination device on the vehicle, and a person-related type of perception of a generated illumination geometry, the method comprising the steps of:
determining a first value of a light generated by the illumination device for at least one first point located within an illuminable area that the illumination device is configured to illuminate, based on the at least one parameter;
determining a second value of the light intensity generated by the illumination device for each point of a plurality of second points, based on the first value of the light intensity, wherein the plurality of second points is arranged in the surroundings of the illumination device including the illuminable area;
determining a light distribution the illumination device is configured to generate based on the first value of the light intensity and the second value of the light intensity; and
outputting the light distribution to an interface.

\* \* \* \* \*